(12) United States Patent
Cho

(10) Patent No.: US 11,284,153 B2
(45) Date of Patent: Mar. 22, 2022

(54) DISPLAY APPARATUS AND METHOD FOR DISPLAYING VOD UPDATE INFORMATION IN ELECTRONIC PROGRAM GUIDE

(71) Applicant: SAMSUNG ELECTRONICS CO., LTD., Suwon-si (KR)

(72) Inventor: Eun Joo Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 16/480,451

(22) PCT Filed: Mar. 2, 2018

(86) PCT No.: PCT/KR2018/002552
§ 371 (c)(1),
(2) Date: Jul. 24, 2019

(87) PCT Pub. No.: WO2018/160044
PCT Pub. Date: Sep. 7, 2018

(65) Prior Publication Data
US 2019/0387276 A1    Dec. 19, 2019

(30) Foreign Application Priority Data

Mar. 2, 2017 (KR) .................. 10-2017-0027051

(51) Int. Cl.
*H04N 21/462* (2011.01)
*H04N 21/458* (2011.01)
(Continued)

(52) U.S. Cl.
CPC ..... *H04N 21/4622* (2013.01); *H04N 21/4586* (2013.01); *H04N 21/47202* (2013.01); *H04N 21/4821* (2013.01)

(58) Field of Classification Search
CPC .......... H04N 21/4622; H04N 21/4586; H04N 21/47202; H04N 21/4821
See application file for complete search history.

(56) References Cited

U.S. PATENT DOCUMENTS 8,046,817 B2  10/2011  Nagano
9,204,191 B2  12/2015  Lee
(Continued)

FOREIGN PATENT DOCUMENTS

JP    2009-017259    1/2009
KR    10-0686689     2/2007
(Continued)

OTHER PUBLICATIONS

International Search Report for PCT/KR2018/002552, dated Jun. 18, 2018, 4 pages.
(Continued)

*Primary Examiner* — Michael R Telan
(74) *Attorney, Agent, or Firm* — Nixon & Vanderhye, P.C.

(57) ABSTRACT

A display device is disclosed. According to an embodiment, the display device may include a communication circuitry to receive first information on broadcast content and second information on an update of video on demand (VOD) content, a display, and a processor electrically connected with the communication circuitry and the display. The processor may be configured to display, on the display, an electronic program guide including a channel list including a plurality of channels, time information, and information on a plurality of programs based on the channel list and the time information, and display, when receiving second information associated with at least one program of the plurality of programs through the communication circuitry, the second information on an area corresponding to information of an updated program which is a program associated with the
(Continued)

second information. In addition, various embodiments are possible throughout the disclosure.

12 Claims, 20 Drawing Sheets

(51) Int. Cl.
*H04N 21/472* (2011.01)
*H04N 21/482* (2011.01)

(56) References Cited

U.S. PATENT DOCUMENTS

| | | | | |
|---|---|---|---|---|
| 2006/0174270 | A1* | 8/2006 | Westberg | H04N 5/782 |
| | | | | 725/39 |
| 2008/0046928 | A1* | 2/2008 | Poling | H04N 21/482 |
| | | | | 725/40 |
| 2008/0148322 | A1* | 6/2008 | Howcroft | H04N 21/4314 |
| | | | | 725/87 |
| 2008/0273114 | A1* | 11/2008 | Hardacker | H04N 21/4223 |
| | | | | 348/468 |
| 2008/0276276 | A1 | 11/2008 | Lim et al. | |
| 2009/0037954 | A1 | 2/2009 | Nagano | |
| 2011/0093897 | A1* | 4/2011 | Gerba | H04N 21/812 |
| | | | | 725/42 |
| 2012/0204215 | A1* | 8/2012 | Hayashi | H04N 21/4334 |
| | | | | 725/88 |
| 2013/0247102 | A1* | 9/2013 | Del Sesto | H04N 21/23109 |
| | | | | 725/42 |
| 2014/0181868 | A1* | 6/2014 | O'Callaghan | H04N 21/4821 |
| | | | | 725/39 |
| 2015/0082348 | A1 | 3/2015 | Lee | |
| 2015/0229981 | A1* | 8/2015 | Williams | H04N 21/25891 |
| | | | | 725/54 |
| 2016/0057483 | A1* | 2/2016 | Natarajan | H04N 21/8405 |
| | | | | 725/100 |
| 2016/0150285 | A1* | 5/2016 | Thomas | H04N 21/47202 |
| | | | | 725/50 |

FOREIGN PATENT DOCUMENTS

| | | |
|---|---|---|
| KR | 10-2008-0097264 | 11/2008 |
| KR | 10-2012-0011571 | 2/2012 |
| KR | 10-2015-0031660 | 3/2015 |
| KR | 10-2016-0023419 | 3/2016 |
| KR | 10-1639306 | 7/2016 |

OTHER PUBLICATIONS

Written Opinion of the ISA for PCT/KR2018/002552, dated Jun. 18, 2018, 5 pages.

* cited by examiner

| Guide | | | Saturday, March 7 11:00pm | |
|---|---|---|---|---|
| | o The Big Bang Theory<br>DIV Satellite\|13\|CNN 11:00pm - 11:30pm | | | |
| All Channels | ON NOW<br>11:00 pm | 11:30 pm | TOMORROW<br>12:00 am | 12:30 am |
| 12 ABC | Prism Awards | Alaska State Troopers | Rocket City Rednecks | |
| 13 CNN | The Big Bang The... | Breaking Bad | Orphan Black | Trophy |
| 14 CNN News | Anderson Cooper 360 | | Piers Morgan Tonight | AC360 Later |
| 15 CBS HD | The Big Bang The... | Criminal Minds | CSI:Crime Scene Investigation | |
| 16 J GOLF | European Tour 2016 UPDATED | | | |

| Guide | | Saturday, March 7 11:00pm | | |
|---|---|---|---|---|
| | ○ The Big Bang Theory<br>DIV Satelite l13|CNN 11:00pm – 11:30pm | | | |
| All Channels | 11:00 pm | 11:30 pm | TOMORROW<br>12:00 am | 12:30 am |
| 12 ABC | Prism Awards | Alaska State Troopers | Rocket City Rednecks | |
| 13 CNN | The Big Bang The... | Breaking Bad | Orphan Black | Trophy |
| 14 CNN News | Anderson Cooper 360 | | Piers Morgan Tonight | AC360 Later |
| 15 CBS HD | ▼ The Big Bang The... | Criminal Minds | CSI:Crime Scene Investigation | |
| 16 J GOLF | The Player H/L | Live From | European Tour Weekly | Live From |

| Guide | | | Saturday, March 7 11:00pm | | |
|---|---|---|---|---|---|
| | o The Big Bang Theory<br>DIV Satelite |13| CNN 11:00pm - 11:30pm | | | | |
| All Channels | ON NOW<br>11:00 pm | 11:30 pm | TOMORROW<br>12:00 am | 12:30 am | |
| 12 ABC | Prism Awards | Alaska State Troopers | Rocket City Rednecks | | |
| 13 CNN | 510—The Big Bang The... | Breaking Bad | Orphan Black | Trophy | |
| | The Big Bang Theory Ep.5 UPDATED | | | | |
| 14 CNN News | Anderson Cooper 360 | | Piers Morgan Tonight | AC360 Later | |
| 15 CBS HD | The Big Bang The... | Criminal Minds | CSI:Crime Scene Investigation | | |

| Guide | | | Saturday, March 7 11:00pm | |
|---|---|---|---|---|
| | o The Big Bang Theory<br>DIV Satelite |13| CNN 11:00pm - 11:30pm | | | 720 |
| All Channels | ON NOW<br>11:00 pm | 11:30 pm | TOMORROW<br>12:00 am | 12:30 am |
| 12 ABC | Prism Awards | Alaska State Troopers | Grey's Anatomy | |
| | | Grey's Anatomy Ep.3 UPDATED | | |
| 13 CNN | The Big Bang The... | Breaking Bad | Orphan Black | Trophy |
| 14 CNN News | Anderson Cooper 360 | | Piers Morgan Tonight | AC360 Later |
| 15 CBS HD | The Big Bang The... | Criminal Minds | CSI:Crime Scene Investigation | |

FIG. 7C

| Guide | | | Saturday, March 7 11:00pm | | |
|---|---|---|---|---|---|
| | ○ GOOD WIFE EP. 12 | | | | |
| | DIV Satelite \|6\|SBS 11:00pm - 12:30am | | | | |
| | COURTROOM INVESTIGATION DRAMA THAT, WHEN HUSBAND WAS ARRESTED, HIS WIFE, WHO HAD QUIT HER JOB SINCE MARRIAGE RETURNED TO LAWYER AND VISITED HIS TRUE IDENTITY. | | | | |
| All Channels | ON NOW 11:00 pm | 11:30 pm | TOMORROW 12:00 am | 12:30 am | |
| 6 SBS | | GOOD WIFE EP. 12 | | | |
| 13 CNN | The Big Bang The... | Breaking Bad | Orphan Black | Trophy | |
| 14 CNN News | Anderson Cooper 360 | | Piers Morgan Tonight | AC360 Later | |
| 15 CBS HD | The Big Bang The... | Criminal Minds | CSI:Crime Scene Investigation | | |
| 16 J GOLF | The Player H/L | Live From | European Tour Weekly | Live From | |

FIG. 10B

DISPLAY APPARATUS AND METHOD FOR DISPLAYING VOD UPDATE INFORMATION IN ELECTRONIC PROGRAM GUIDE

This application is the U.S. national phase of International Application No. PCT/KR2018/002552 filed 2 Mar. 2018, which designated the U.S. and claims priority to KR Patent Application No. 10-2017-0027051 filed 2 Mar. 2017, the entire contents of each of which are hereby incorporated by reference.

TECHNICAL FIELD

Embodiments disclosed in the disclosure relate to a technique of displaying VOD update information on an electronic program guide.

BACKGROUND ART

A device, such as a TV or a set-top box, to receive a broadcast signal provides a menu or a user interface (UI), such as an electronic program guide, associated with a broadcast schedule to allow a user to easily search for a broadcast program. The electronic program guide provided in a conventional set-top box displays program information which is viewable at a future time point based on a present time point.

In addition, the conventional set-top box separately provides the electronic program guide for broadcast content, which is currently being broadcasted, and a menu or a UI for video on demand (VOD) content. Accordingly, there is absent the connection between the broadcast content and the VOD content.

Recently, the viewing of VOD content over the Internet has become popular, but a service that connects real-time broadcast content with VOD content is not provided.

SUMMARY

Embodiments of the disclosure are to connect broadcast content with VOD content on an electronic program guide and to display information on an update of VOD content when the VOD content update information is received, thereby providing an effective electronic program guide.

According to an embodiment disclosed in the disclosure, a display device may include a communication circuitry to receive first information on broadcast content and second information on an update of video on demand (VOD) content, a display, and a processor electrically connected with the communication circuitry and the display. The processor may be configured to display, on the display, an electronic program guide including a channel list including a plurality of channels, time information, and information on a plurality of programs based on the channel list and the time information, and display, when receiving second information associated with at least one program of the plurality of programs through the communication circuitry, the second information on an area corresponding to information of an updated program which is a program associated with the second information.

According to an embodiment disclosed in the disclosure, a method for displaying an electronic program guide may include receiving first information on broadcast content and second information on an update of VOD content, displaying an electronic program guide including a channel list including a plurality of channels based on the first information, time information, and information on a plurality of programs based on the channel list and the time information, and displaying the second information on an area corresponding to information of an updated program associated with the second information, when receiving the second information associated with at least one program of the plurality of programs.

According to embodiments disclosed in the disclosure, the VOD content information associated with the broadcast content may be displayed on the electronic program guide, and the information on the update of the VOD content may be variously displayed, so a user easily uses the content.

Besides, a variety of effects directly or indirectly understood through the disclosure may be provided.

BRIEF DESCRIPTION OF THE DRAWINGS

FIG. 4A is a view illustrating a screen for displaying the information on the update of the VOD content on an area for displaying the information on a program in the electronic program guide, according to an embodiment;

FIG. 4C is a view illustrating a screen having an indicator marked thereon to indicate information on an update of VOD content in an electronic program guide, according to an embodiment;

FIG. 5A is a view illustrating a screen showing information on an update of VOD content, which is associated with a program having a cursor in an electronic program guide according to an embodiment;

FIG. 5B is a view illustrating a screen showing information on an update of VOD content which is associated with a program adjacent to a cursor in an electronic program guide, according to an embodiment;

FIG. 7C is a view illustrating a screen in which information on an update of another VOD content is displayed as the electronic program guide is scrolled, according to an embodiment;

FIG. 10B is a view illustrating a screen having an electronic program guide, which includes information on VOD content, displayed based on an input into a UI, according to an embodiment.

DETAILED DESCRIPTION OF EXAMPLE EMBODIMENTS

Figure 1:
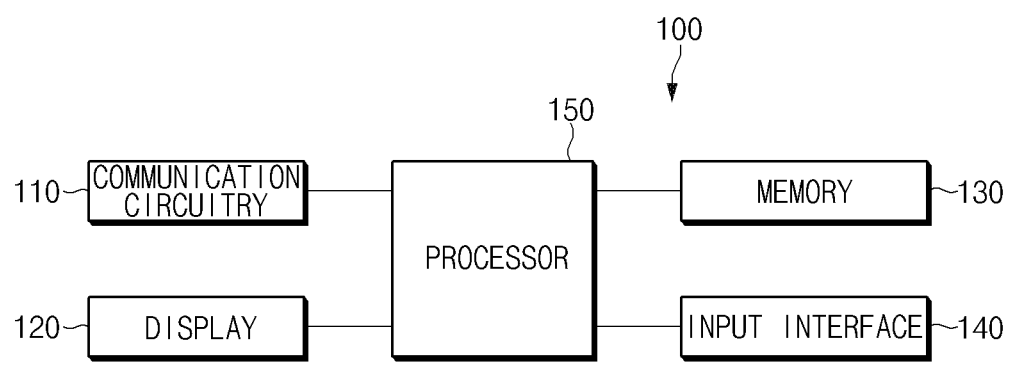
FIG. 1 is a block diagram of a display device, according to an embodiment.

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure. With regard to description of drawings, similar elements may be marked by similar reference numerals.

VOD content described in the disclosure may include a broadcast signal of content provided through a VOD service or a video file provided through the VOD service.

FIG. 1 is a block diagram of a display device, according to an embodiment.

Referring to FIG. 1, a display device 100 may include a communication circuitry 110, a display 120, a memory 130, an input interface 140, and a processor 150. According to various embodiments, the display device 100 may omit at least one of the above-mentioned components or may further include other components.

The communication circuitry 110 may receive broadcast content, information on the broadcast content, video on demand (VOD) content, information on the VOD content, and information on an update of the VOD content. The communication circuitry 110 may make wired and wireless communication. In addition, the communication circuitry 110 may receive the broadcast content from a broadcast signal provider or may receive a content signal from an external electronic device such as a set-top box, a game console (e.g., Xbox™, PlayStation™, or the like). In one embodiment, the information on the broadcast content may include at least one of information on the channel of the broadcast content, information on a program name of the broadcast content, and information on broadcast time of the broadcast content. The information on the update of the VOD content may include at least one of a program name of the VOD content, program information associated with the VOD content, information on time, at which the VOD content is updated, and information on the priority in an electronic program guide.

The display 120 may display an electronic program guide (EPG), broadcast content, VOD content, or various user interfaces (UIs) under the control of the processor 150. For example, the display 120 may display the electronic program guide and may further display a UI included in the electronic program guide.

The memory 130 may store information on broadcast content, information on the update of VOD content, or the like. In one embodiment, the channel information, the program name information, and the broadcast time information, which are stored in the memory 130, may be used by the processor 150 to generate the electronic program guide. In one embodiment, the program name of the VOD content, the program information associated with the VOD content, the time information that the VOD content is updated, and the priority information in the electronic program guide may be used by the processor 150 to display additional information or the UI to the electronic program guide.

The input interface 140 may obtain an input from a user. The input interface 140 may obtain the movement input of a cursor, which is displayed on the electronic program guide, from the user and obtain a viewing for an input for a program corresponding to the position of the cursor. In one embodiment, when a UI associated with the update of VOD content is displayed on the electronic program guide, an input for a request for the reproduction of updated VOD content or an input for a request for continuous reproduction of VOD content, which is a series, may be obtained.

The processor 150 may be electrically connected with the communication circuitry 110, the display 120, the memory 130 and the input interface 140 to control the overall operation of the display device 100. For example, the processor 150 may display the electronic program guide on the display 120, based on information on the broadcast content. The processor 150 may display a UI for obtaining information on the update of VOD content and the input for the request for the reproduction of the VOD content, on an area corresponding to the information on the updated program, based on the information on the broadcast content and the information on the update of the VOD content. Hereinafter, various operational examples of the processor 150 will be described.

Hereinafter, a method that the display device 100 displays the update information on the electronic program guide will be described with reference to FIGS. 2 to 7C.

Figure 2:
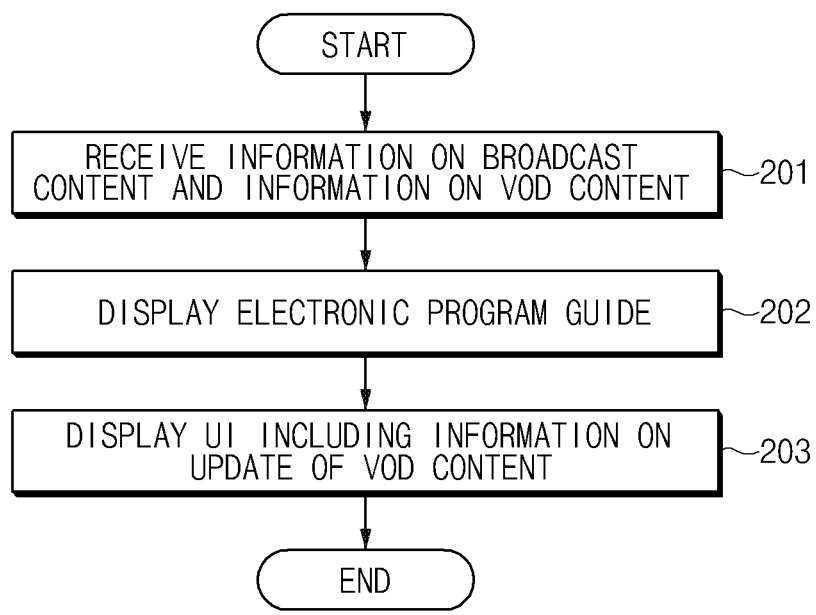
FIG. 2 is a flowchart illustrating a method that the display device displays the UI, according to an embodiment.

FIG. 2 is a flowchart illustrating a method that the display device displays the UI, according to an embodiment.

In operation 201, the communication circuitry 110 may receive first information on the broadcast content and second information on an update of VOD content.

In one embodiment, the first information includes a channel, time information, or information on a program (e.g., program name) of the broadcast content. The second information may include at least one of a program name of the VOD content, program information associated with the VOD content, information on time at which the VOD content is updated, and information on a priority in the electronic program guide.

In operation 202, the processor 150 may display, on the display 120, an electronic program guide including a channel list including a plurality of channels, time information, and information on a plurality of programs based on the channel list and the time information.

Figure 3:
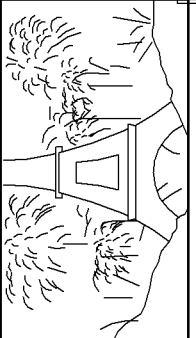
FIG. 3 is a view illustrating the electronic program guide displayed on the display device, according to an embodiment.

FIG. 3 is a view illustrating the electronic program guide displayed on the display device, according to an embodiment.

In an embodiment, the electronic program guide may include an area 310 for displaying the channel list, an area 320 for displaying the time information, and an area 330 for displaying the program information. Referring to FIG. 3, a plurality of channel numbers and a plurality of channel names may be arranged in a vertical direction in the area 310 for displaying the channel list. The time information may be arranged in a horizontal direction in the area 320 for displaying the time information. The program information may be arranged in the area 330 for displaying the program information, based on the channel list and the time information.

In operation 203, the processor 150 may display, on the display 120, the UI including VOD content update information.

According to an embodiment, when the processor 150 receives second information associated with at least one program of a plurality of programs through the communication circuitry 110, the processor 150 may display an UI including second information on an area corresponding to information on an updated program, which is a program associated with the second information, in the electronic program guide. For example, the processor 150 may display a UI for displaying information on the update of the VOD content on an area for displaying the name of an updated program, or an expansion area under the area for displaying the name of the updated program.

In an embodiment, the displayed second information may include information on an update of VOD content of another program associated with at least one updated program.

In an embodiment, the UI including the information on the update of the VOD content may include an object to obtain an input for a request for the reproduction of the VOD content corresponding to the second information which is displayed.

In an embodiment, when the VOD content corresponding to the second information is a series, the UI including information on the update of the VOD content may include an object to obtain the input for the request for the continuous reproduction of the plurality pieces of VOD content, which corresponds to a series.

In an embodiment, the UI including the information on the update of the VOD content may include an input object to display additional information on at least one program.

The embodiment in which the processor 150 displays the UI including the information on the update of the VOD content may be variously implemented depending on a position that the UI is displayed, a display form of the UI, a condition that the UI is displayed, and whether to maintain the UI display depending on scrolling, in addition to the above embodiment. Hereinafter, various embodiments that the processor 150 displays on the display 120, the UI including the information on the update of the VOD content will be described with reference to FIGS. 4A to 7C. The above-described embodiments may be not only implemented independently from each other, but may be combined with each other.

FIG. 4A is a view illustrating a screen for displaying the information on the update of the VOD content on an area for displaying the information on a program in the electronic program guide, according to an embodiment.

According to an embodiment, the processor 150 may display information 410 on the update of the VOD content on the area for displaying the information of the program in overlap with the area for displaying the information of the program.

When the communication circuitry 110 receives information on the update of the content that VOD content, 'EuropeanTour 2016', is updated, the processor 150 may display the information 410 on the update of the VOD content on the area corresponding to 'EuropeanTour Weekly', which is the program of the channel of 'JGOLF', which is associated with the update information on the VOD content as illustrated in FIG. 4A.

In an example of FIG. 4A, the area corresponding to 'EuropeanTour Weekly', is an area for displaying the name of the program. Accordingly, the processor 150 may display the information 410 on the update of the VOD content that the 'EuropeanTour 2016' is updated, on the area in which the name of the program is displayed, as illustrated in FIG. 4A.

Although the information 410 on the update of the VOD content is displayed on the entire area for the program information corresponding to the channel of 'JGOLF', the information on the update of the VOD content may be displayed on a portion of the area for the program information corresponding to the channel of 'JGOLF'.

Figure 4B:
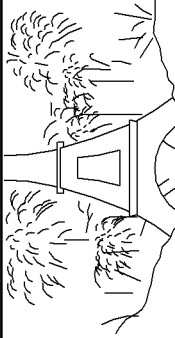
FIG. 4B is a view illustrating a screen having the information on the update of the VOD content displayed on the expansion area in the electronic program guide, according to an embodiment.

FIG. 4B is a view illustrating a screen having information on a update of VOD content displayed on an expansion area in the electronic program guide, according to an embodiment.

According to an embodiment, the processor 150 may display the information on the update of the VOD content, on an area 420 adjacent to the area for displaying the information on the program.

When the processor 150 receives information on the update of the VOD content that VOD content of 'The Big Bang Theory Episode. 5' is updated, the processor 150 may display the information 430 on the update of the VOD content, on the area 420 corresponding to 'The Big Bang Theory', which is a program of the channel of 'CNN', which is associated with the information on the update of the VOD content.

In an example of FIG. 4B, the area corresponding to 'The Big Bang Theory' is a blank area 420 positioned under an area for displaying the name of the program. Accordingly, the processor 150 may display the information 430 on the update of the VOD content that VOD content of 'The Big Bang Theory Episode. 5' is updated, on an expansion area 420 which is the blank area under the area for displaying the name of the program as illustrated in FIG. 4B.

In an embodiment, information 430, which is displayed, on the update of the VOD content may be an object to obtain the input for the request for the reproduction of the VOD content. The processor 150 may reproduce 'The Big Bang Theory Episode. 5' displayed, based on the input obtained through the input interface 140.

In an embodiment, 'The Big Bang Theory' is a series, and the displayed 'The Big Bang Theory Episode. 5' may be an object to obtain the input for the request for the continuous reproduction of a plurality of VOD content, which is a series. The processor 150 may continuously reproduce the VOD content from episodes 1 to 5 of 'The Big Bang Theory' based on the input obtained through the input interface 140.

Although not illustrated in FIGS. 4A and 4B, the object for obtaining the input for the request for the reproduction of the VOD content may be separately displayed.

FIG. 4C is a view illustrating a screen having an indicator displayed thereon to indicate information on an update of VOD content in an electronic program guide, according to an embodiment.

Figure 4D:
FIG. 4D is a view illustrating a result screen obtained by receiving an input for the indicator, according to an embodiment.

FIG. 4D is a view illustrating a result screen obtained by receiving an input for the indicator, according to an embodiment.

In an embodiment, the processor 150 may display the information on the update of the VOD content in the form of the indicator, when the information on the update of the VOD content is associated with a program of broadcast content corresponding to time information which is not displayed on a present screen.

The processor 150 receives the information on the update of the VOD content that VOD content of 'Beyond Episode. 3' is updated through the communication circuitry 110, and 'Beyond', which is a program of the channel of 'CBS HD', is a program corresponding to 10:00 pm to 11:00 pm which is not currently displayed in FIG. 4C Accordingly, the processor 150 may display an indicator 440 on an area corresponding to 'Beyond' of the channel of 'CBS HD', which is associated with the information on the update of the VOD content, as illustrated in FIG. 4C.

In an example of FIG. 4C, when considered based on time information, 11:00 pm to 01:00 am, which is displayed on the present screen, 10:00 pm to 11:00 p.m., which is time information of 'Beyond', corresponds to the past, and the channel of 'Beyond' is 'CBS HD'. Accordingly, an area corresponding to 'Beyond' may be a left area of the program, which is displayed on the leftmost side, of the program of 'CBS HD' currently displayed. The processor 150 may display the indicator 440 on the left area of 'The Big Bang Theory' which is displayed on the leftmost side of 'CBS HD', as illustrated in FIG. 4C.

In an embodiment, the indicator 440 may be an object to obtain an input for displaying an electronic program guide corresponding to time information corresponding to the information on a program. For example, when the processor obtains an input for the indicator 440 illustrated in FIG. 4C through the input interface 140, the processor 150 may display the electronic program guide, which is illustrated in FIG. 4D, corresponding to the time information 10:00 pm to 11:00 pm of 'Beyond'. According to one embodiment, when the electronic program guide as illustrated in FIG. 4D is displayed, the processor 150 may display information 450 on the update of VOD content on an area, in which the information on the program is displayed, in overlap with the area as illustrated in FIG. 4A, or may display the information on the update of the VOD content as illustrated in FIG. 4B, on an area adjacent to the area in which the information of the program is displayed.

FIG. 5A is a view illustrating a screen showing information on an update of VOD content, which is associated with a program having a cursor in an electronic program guide according to an embodiment.

In an embodiment, as illustrated in FIG. 5A, the electronic program guide may include a cursor 510 displayed corresponding to one of a plurality of pieces of program information.

In an embodiment, when the processor receives information on the update of VOD content that VOD content of 'The Big Bang Theory Episode. 5' is updated through the communication circuitry 110, and the cursor 510 is displayed on 'The Big Bang Theory' associated with information on the update of the VOD content, the processor 150 may display information 520 on an update of VOD content as illustrated in FIG. 5A.

In an embodiment, when the cursor 510 is marked on 'Breaking Bad', even if the processor 150 receives information on the update of the VOD content that the 'The Big Bang Theory Episode. 5', which is VOD content, is updated through the communication circuitry 110, the processor 150 may not display information on the update of the VOD content.

Figure 5B:
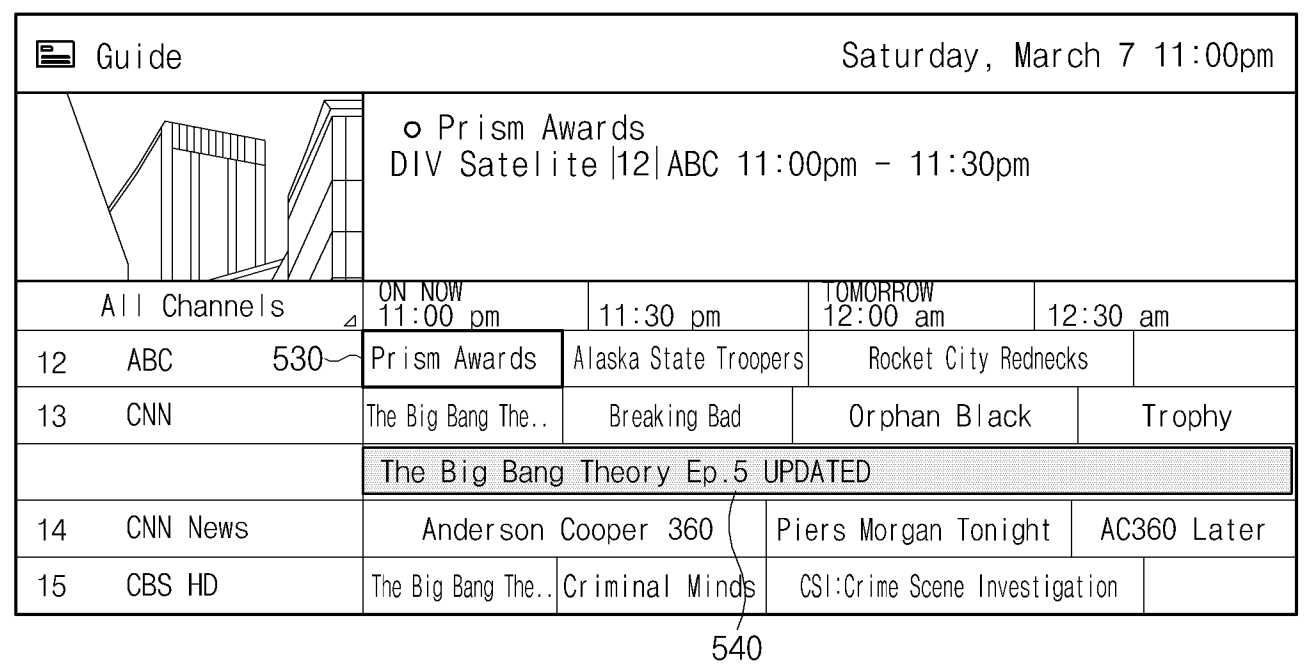

FIG. 5B is a view illustrating a screen showing information on an update of VOD content, which is associated with a program adjacent to a cursor in an electronic program guide according to an embodiment.

In an embodiment, when the processor receives information on am update of VOD content that VOD content of 'The Big Bang Theory Episode. 5' is updated through the communication circuitry 110, and a cursor 530 is displayed in a preset distance from the position where 'The Big Bang Theory' associated with information on the update of the VOD content is displayed, the processor 150 may display information 540 on the update of the VOD content as illustrated in FIG. 5B.

For example, the preset distance is assumed as being the distance of one block in which the program information is displayed, in the electronic program guide.

In FIG. 5B, when the cursor 530 is displayed on 'Prism Awards', the cursor 530 is displayed within a preset distance from a position at which The Big Bang Theory' is displayed. Accordingly, the processor 150 may display the information 540 on the update of the VOD content.

In an embodiment, even when the processor receives information on an update of VOD content that 'The Big Bang Theory Episode. 5', which is the VOD content, is updated, and the cursor 530 is marked on 'Breaking Bad', and 'Anderson Cooper 360' positioned within the distance of one block from a position at which 'The Big Bang Theory' is displayed, the processor 150 may display the information 540 on the update of the VOD content as illustrated in FIG. 5B.

In an embodiment, when the cursor 530 is marked on 'Rocket City Rednecks', even if the processor 150 receives information on the update of the VOD content that the 'The Big Bang Theory Episode. 5', which is VOD content, is updated through the communication circuitry 110, the processor 150 may not display information on the update of the VOD content.

Figure 6A:
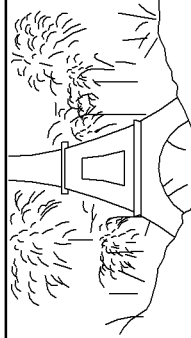
FIG. 6A is a view illustrating a screen having the information on an update of the VOD content displayed on a fixed area in the electronic program guide, according to an embodiment.

FIG. 6A is a view illustrating a screen having the information on the update of the VOD content displayed on a fixed area in the electronic program guide, according to an embodiment.

Figure 6B:
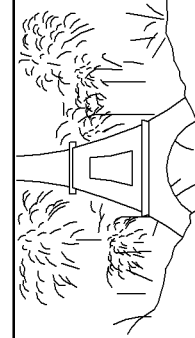
FIG. 6B is a view illustrating a screen having the information on the update of the VOD content displayed on a fixed area after the electronic program guide is scrolled, according to an embodiment.

FIG. 6B is a view illustrating a screen having the information on the update of the VOD content displayed on a fixed area after the electronic program guide is scrolled, according to an embodiment.

In an embodiment, regardless of that a page, on which program information is displayed, is scrolled, the electronic program guide may include a fixed area 610 continuously displaying the program information of a channel. For example, in FIGS. 6A and 6B, when the fixed area 610 is the area 610 for displaying program information of 'TV PLUS Drama' channel, and, and the electronic program guide, which shows program information of channel 12 to channel 15, of FIG. 6A is scrolled down, the electronic program guide illustrated in FIG. 6B may continuously display the program information of the channel of 'TV PLUS Drama'

In an embodiment, when the information on the update of the VOD content, which is received by the processor through the communication circuitry 110, is associated with a plurality of programs corresponding to the channel displayed on the fixed area 610, the processor 150 may determine a program for displaying relevant information on an update of VOD content of a plurality of programs, based on a preset reference.

For example, the preset reference may include at least one of information on time at which VOD content is updated, information on time at which information on the update of the VOD content is received, information on a priority included in the information on the update of the VOD content, preset channel information (e.g., a preference channel set in the display device 100), viewing history information, and user setting information.

For example, when programs corresponding to the channel of 'TV PLUS Drama' includes 'Sherlock', 'Man with a plan' and 'Lucifer', and when information that 'Sherlock' has a priority is included in information on the update of the VOD content, the processor 150 may display information 620 on an update of a VOD content associated with 'Sherlock', as illustrated in FIGS. 6A and 6B. The processor 150 may display information 620 on an update of VOD content on an area in which the program information is displayed, in overlap with the area by combining the above-described embodiments, and 'continuous viewing of Sherlock' may be an object 620 to obtain an input for a request for the continuous reproduction of a plurality of pieces of VOD content which corresponds to a series.

Figure 7A:
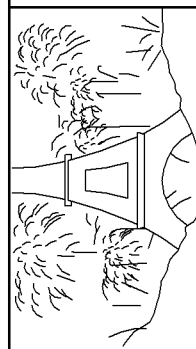
FIG. 7A is a view illustrating a screen in which the information on the update of the VOD content is displayed in the electronic program guide, according to an embodiment.

FIG. 7A is a view illustrating a screen in which information on an update of VOD content is displayed in the electronic program guide, according to an embodiment.

Figure 7B:
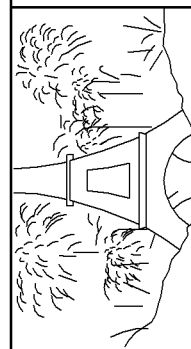
FIG. 7B is a view illustrating a screen in which information on the update of the VOD content, which is illustrated in FIG. 7A, is not displayed as an electronic program guide is scrolled, according to an embodiment.

FIG. 7B is a view illustrating a screen in which information on the update of the VOD content, which is illustrated in FIG. 7A, is not displayed as an electronic program guide is scrolled, according to an embodiment.

FIG. 7C is a view illustrating a screen in which information on an update of another VOD content is displayed as the electronic program guide is scrolled, according to an embodiment.

In an embodiment, a page, on which program information is displayed, of the electronic program guide may be scrolled.

In an embodiment, when a plurality of programs associated with information on an update of VOD content are present, the processor 150 may determine a program to be marked with information on the update of the VOD content based on the preset reference. In the state where VOD content update information of the determined program is displayed, after not being displayed on an electronic program guide currently displayed by a scroll, in case the program's information is displayed on an electronic program guide by a scroll again, the processor 150 can determine a remaining program among multiple programs as a program that will display a VOD content update information.

In an embodiment, it is assumed that the processor receives information on an update of VOD content associated with 'Alaska State Troopers' and 'Grey's Anatomy' of FIG. 7A through the communication circuitry 110. The processor 150 may determine a program, which is to be marked with the information on the update of the VOD content, to 'Alaska State Troopers' of 'Alaska State Troopers' and 'Grey's Anatomy' based on a preset reference. As illustrated in FIG. 7A, the processor 150 may display information 710 on an update of VOD content, which is associated with 'Alaska State Troopers', as illustrated in FIG. 7A.

When the processor 150 displays the electronic program guide as illustrated in FIG. 7B as the electronic program guide is scrolled down, 'ABC', which is a channel corresponding to 'Alaska State Troopers', is not displayed. Accordingly, the processor 150 does not display the information 710 on the update of the VOD content, which is associated with 'Alaska State Troopers'.

When the processor 150 displays the electronic program guide again as illustrated in FIG. 7C as the electronic program guide is scrolled up, the processor 150 may determine the program, which is to be marked with the information on the update of the VOD content, to 'Grey's Anatomy', instead of 'Alaska State Troopers' and may display information 720 on an update of VOD content, which is associated with 'Grey's Anatomy', as illustrated in FIG. 7C.

Figure 8:
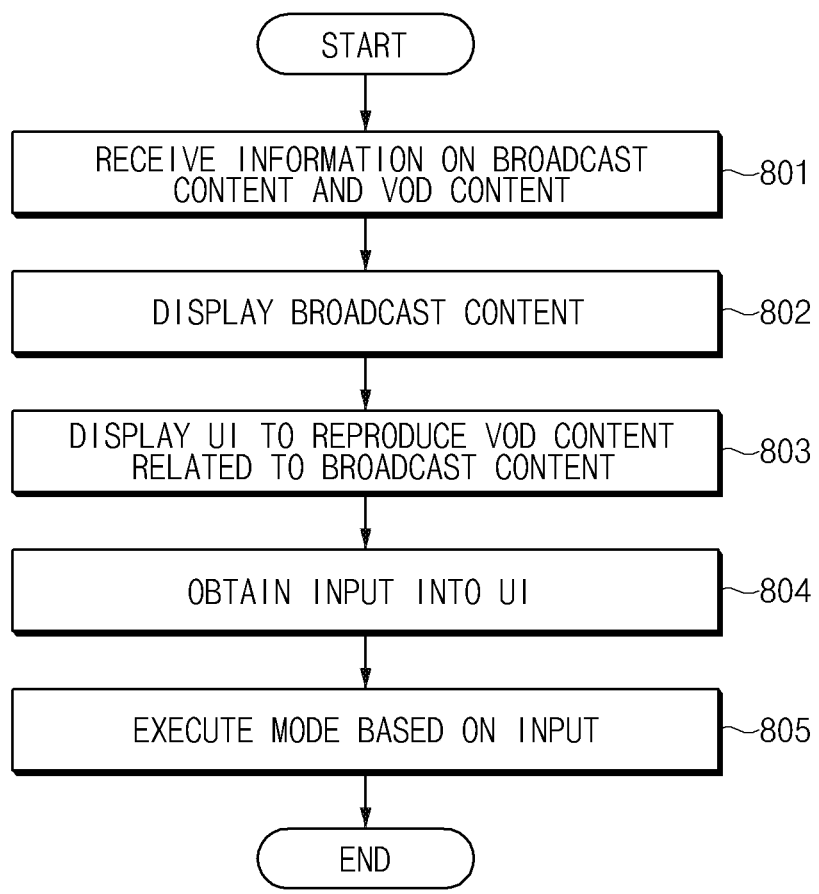
FIG. 8 is a flowchart illustrating a method for displaying a UI for reproducing VOD content associated with broadcast content while the broadcast content is displayed and for executing a mode based on an input into the UI.

FIG. 8 is a flowchart illustrating a method for displaying a UI for reproducing VOD content associated with broadcast content while the broadcast content is displayed and for executing a mode based on an input into the UI.

Referring to FIG. 8, in operation 801, the processor 150 may receive information on broadcast content and VOD content through the communication circuitry 110.

In operation 802, the processor 150 may display, on the display 120, the received broadcast content.

In operation 803, when a viewable VOD content associated with the displayed broadcast content is present, the processor 150 may display, on the display 120, a UI for reproducing the VOD content. The processor 150 may determine whether there is present viewable VOD content associated with the displayed broadcast content, based on the received broadcast VOD content information.

In an embodiment, when there is present the viewable VOD content associated with the displayed broadcast content, the processor 150 may display the UI for reproducing the VOD content or an UI for displaying the electronic program guide including the VOD content information. In another embodiment, when the displayed broadcast content corresponds to a series, and when there is present at least one viewable VOD content corresponding to the series, the processor 150 may display a UI for reproducing the VOD content or for making a reservation to view the VOD content.

In an embodiment, the processor 150 may determine broadcast content to be used for displaying a UI to reproduce the VOD content, based on preset channel information (e.g., a preference channel set in the display device 100), viewing history information, or user setting information. For example, only when the viewable VOD content associated with the broadcast content of a channel registered as a preference channel is present, the processor 150 may display, on the display 120, the UI to reproduce the VOD content.

In operation 804, when the processor 150 obtains an input into the UI through the input interface 140, the processor 150 may execute a mode based on the input in operation 805.

In an embodiment, when the processor 150 obtains the input into the UI for reproducing the VOD content through the input interface 140, the processor 150 may reproduce the VOD content.

In an embodiment, when the processor 150 obtains the input into the UI to make a reservation to view the VOD content through the input interface 140, the processor 150 may reproduce the VOD content after the displayed broadcast content is terminated.

The detailed examples of operation 801 to operation 805 will be described with reference to FIGS. 9A to 10B.

Figure 9A:
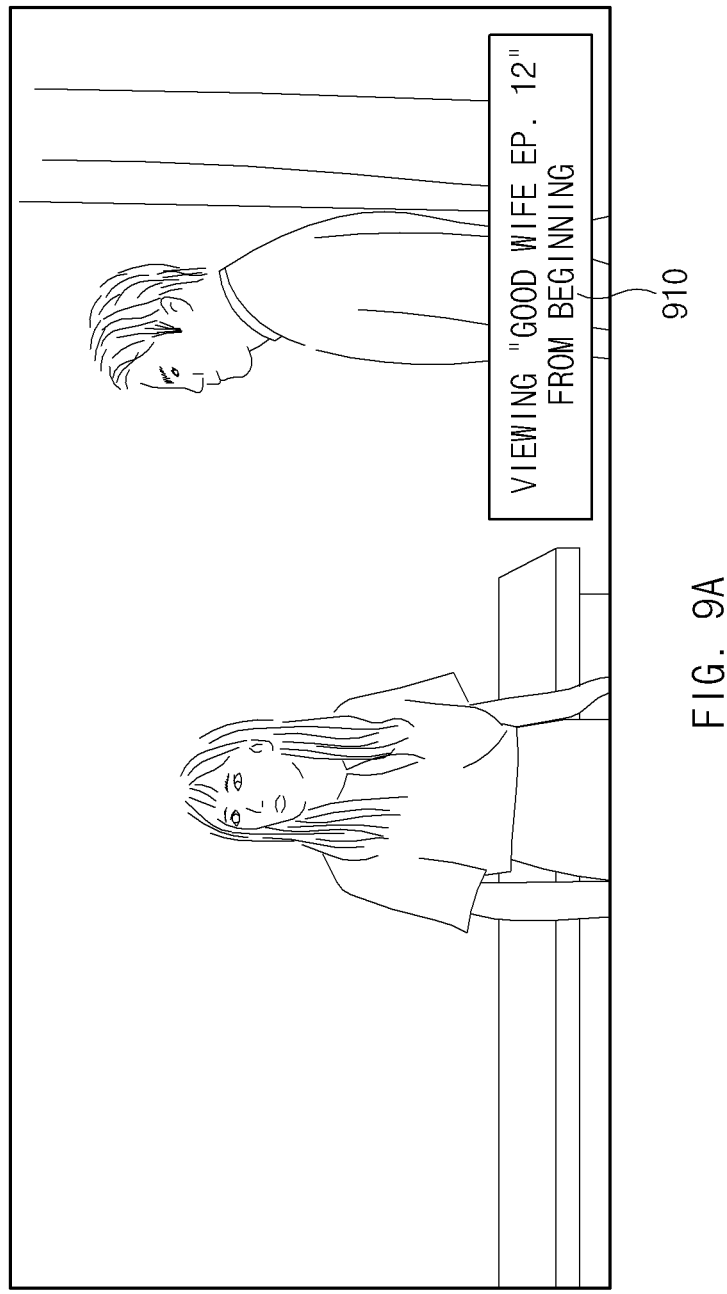
FIG. 9A is a view illustrating the screen having a UI displayed thereon to reproduce VOD content associated with the broadcast content, according to an embodiment.

FIG. 9A is a view illustrating the screen having a UI displayed thereon to reproduce VOD content associated with the broadcast content, according to an embodiment.

Figure 9B:
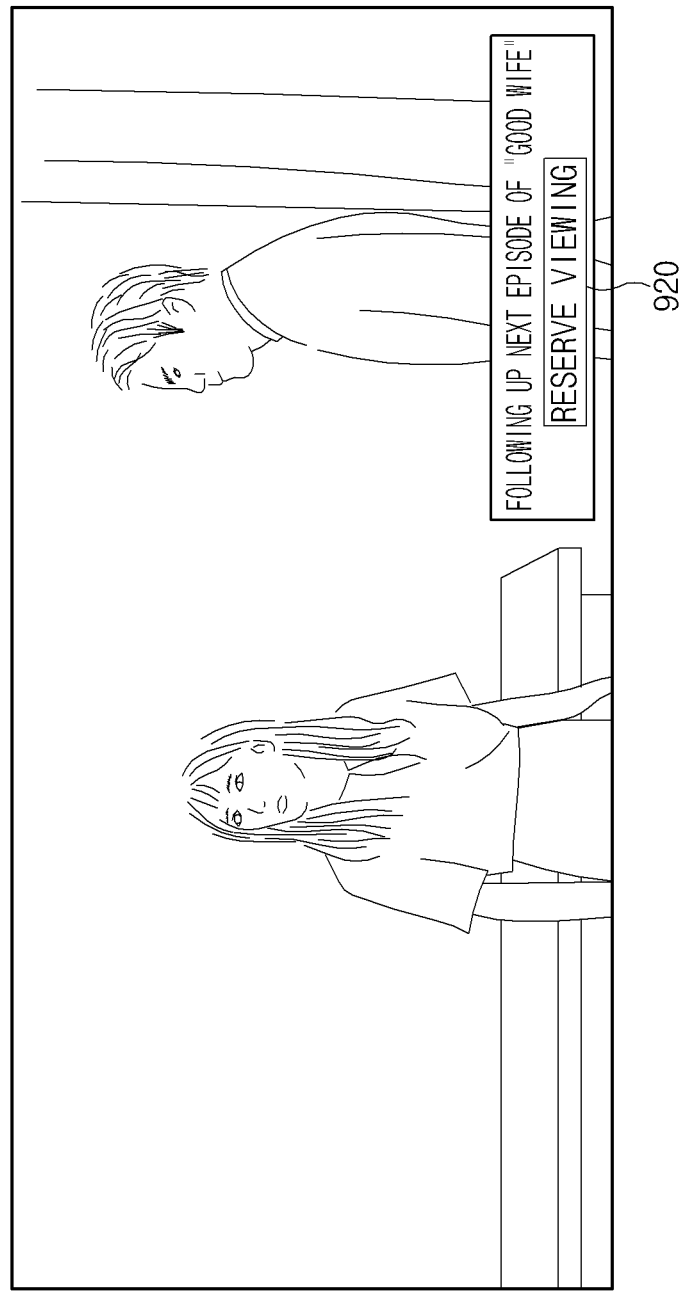
FIG. 9B is a view illustrating the screen having a UI to make a reservation to view VOD content associated with the broadcast content, according to an embodiment.

FIG. 9B is a view illustrating the screen having a UI to make a reservation to view VOD content associated with the broadcast content, according to an embodiment.

Figure 9C:
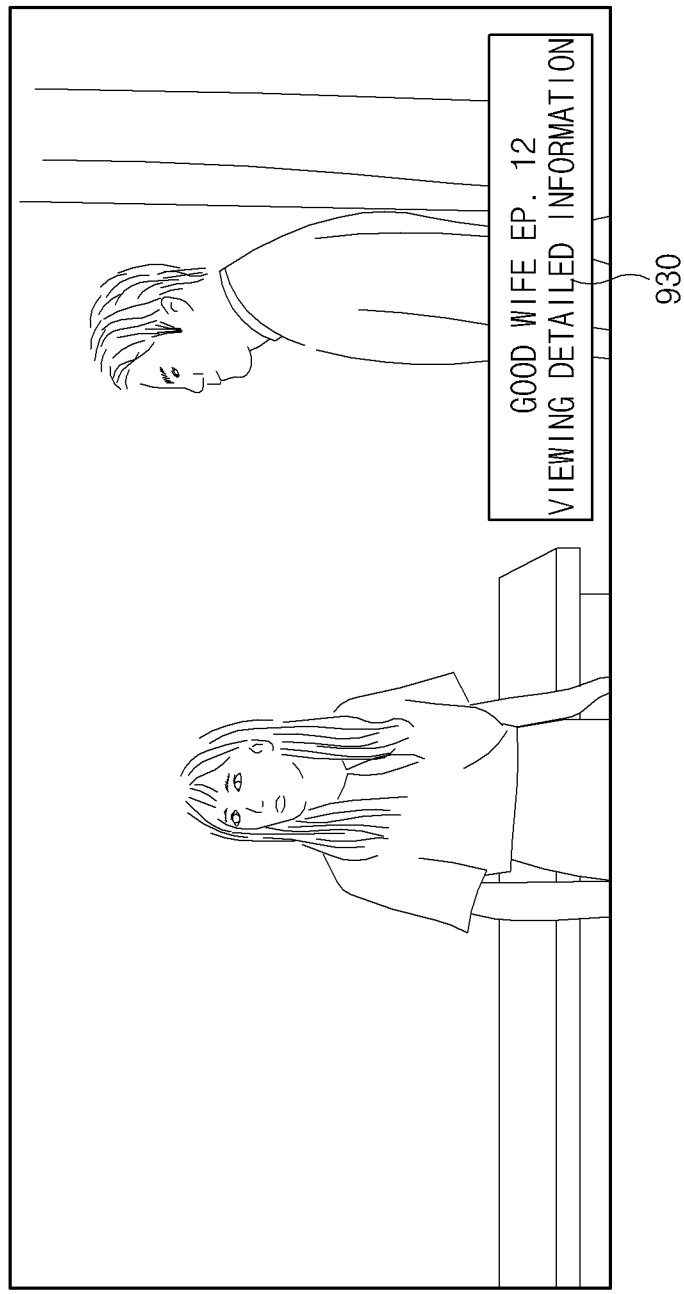
FIG. 9C is a view illustrating the screen having a UI to display an electronic program guide including detailed information associated with broadcast content, according to an embodiment.

FIG. 9C is a view illustrating the screen having a UI to display an electronic program guide including detailed information associated with broadcast content, according to an embodiment.

Figure 10A:
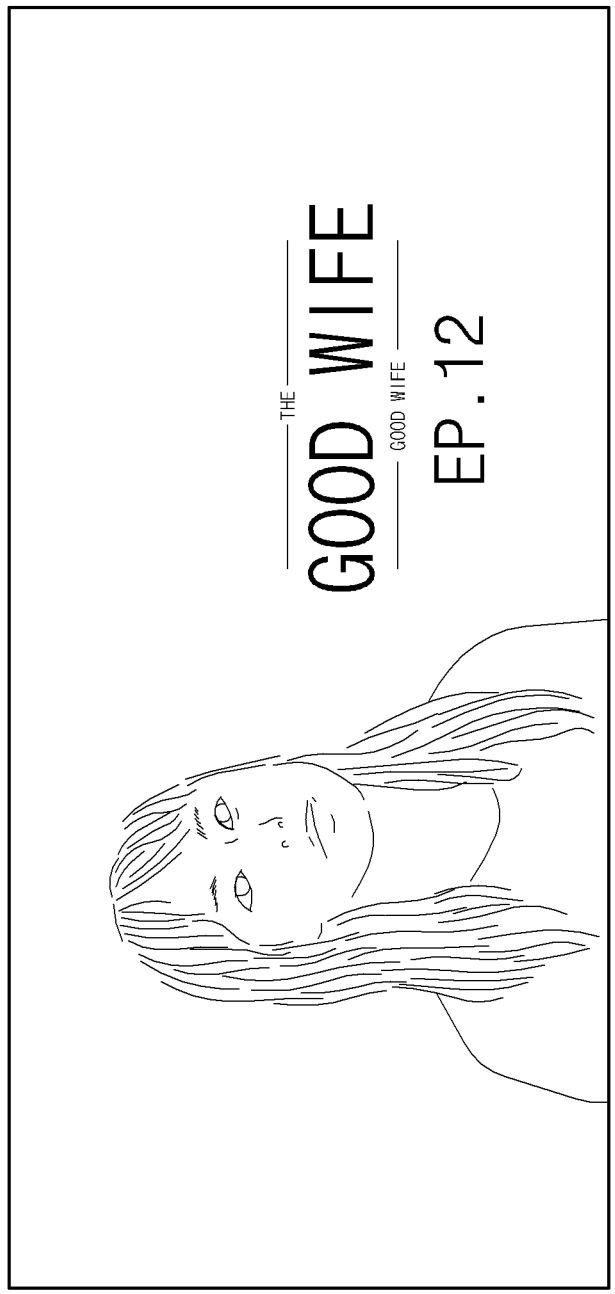
FIG. 10A is a view illustrating a screen for reproducing VOD content based on an input into a UI, according to an embodiment.

FIG. 10A is a view illustrating a screen for reproducing VOD content based on an input into a UI, according to an embodiment.

FIG. 10B is a view illustrating a screen having an electronic program guide, which includes information on VOD content, displayed based on an input into a UI, according to an embodiment.

According to an embodiment, the processor 150 may receive broadcast content of a program of 'Good Wife Episode. 12' and may receive VOD content information associated with 'Good Wife Episode. 12' (operation 801). In an embodiment, the VOD content information may include information that "Good wife" is a series, and the VOD content corresponding to "Good Wife Episode. 1 to Episode. 14" is viewable.

The processor 150 may display, on the display 120, the broadcast content of the program of "Good wife Episode. 12" (operation 802).

Because the viewable VOD content associated with "Good wife Episode. 12", which is the displayed broadcast content, is present, the processor 150 may display, on the display 120, a UI to reproduce the VOD content (operation 803). For example, the processor 150 may display a UI 910 to reproduce from the beginning of the VOD content corresponding to "Good wife Episode. 12" as illustrated in FIG. 9A. For another example, "Good wife Episode. 12", which is the displayed broadcast content, is a series and one or more viewable VOD content are present corresponding to the series. Accordingly, the processor 150 may display a UI 920 to make a reservation to view the VOD content as illustrated in FIG. 9B. For another example, the processor 150 may display a UI for displaying an electronic program guide including the detailed information of "Good wife Episode. 12" as illustrated in FIG. 9C.

The processor 150 may execute a mode based on an input (operation 805) when the processor 150 obtains an input into the UI displayed through the input interface 140 (operation 804). For example, when the UI 910 is displayed to reproduce "Good wife Episode. 12" from the beginning of the "Good wife Episode. 12" as illustrated in FIG. 9A, and the processor 150 obtains an input into the UI 910 through the input interface 140, the processor 150 may reproduce the VOD content corresponding to "Good wife Episode. 12" as illustrated in FIG. 10A. For another example, when the UI 920 is displayed to make a reservation to view VOD content corresponding to a next episode illustrated in FIG. 9B, and the processor 150 obtains an input into the UI 920 through the input interface 140, the processor may reproduce VOD content corresponding to "Good Wife Episode 13" after "Good Wife Episode 12" is terminated. For another example, when a UI is displayed to display an electronic program guide including information on "Good Wife Episode 12" and the processor 150 obtains an input into the UI through the input interface 140, the processor may display the electronic program guide including the information on "Good Wife Episode 12" as illustrated in FIG. 10B.

At least a part of a device (e.g., modules or functions thereof) or a method (e.g., operations) according to various embodiments may be, for example, implemented by instructions stored in a computer-readable storage medium in the form of a program module. The instruction, when executed by a processor, may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an embedded memory. Also, the one or more instructions may contain a code made by a compiler or a code executable by an interpreter While the disclosure has been shown and described with reference to various embodiments thereof, it will be understood by those skilled in the art that various changes in form and details may be made therein without departing from the spirit and scope of the present invention as defined by the appended claims and their equivalents.

What is claimed is:

1. A display device comprising:
communication circuitry;
a display; and
a processor electrically connected with the communication circuitry and the display,
wherein the processor is configured to:
receive first information for a plurality of broadcast programs through the communication circuitry;
based on the first information, generate an electronic program guide including a plurality of channel information that is arranged in a column and a plurality of program information corresponding to each of the channel information, that is arranged in a row;
display the electronic program guide on the display;
receive second information regarding an update of video on demand (VOD) content associated with at least one program information included in the electronic program guide through the communication circuitry;
obtain input for moving a cursor being displayed within the electronic program guide;
identify, among the plurality of program information, program information that is located within a threshold distance from the cursor moved by the input;
determine, based on the second information, whether VOD content associated with the identified program information is updated,
when the VOD content associated with the identified program information is updated, display a graphic user interface (GUI) representing the update of the VOD content associated with the identified program information with the electronic program guide; and
when receiving a user input for scrolling the electronic program guide, scroll the plurality of channel information and the plurality of program information included in the electronic program guide,
wherein, while the plurality of channel information and the plurality of program information are scrolled, the displaying of the GUI is maintained and not scrolled, and
wherein the processor is further configured to:
when at least two program information that are located within the threshold distance from the cursor and included in a same row of the electronic program guide are identified, determine whether each of VOD content associated with each of the identified at least two program information is updated based on the second information,
when the each of VOD content associated with each of the identified at least two program information is updated, display a first GUI representing the update of the VOD content associated with one of the at least two program information while the at least two program information are displayed, and
when the at least two program information are not displayed and then re-displayed by the user input for scrolling the electronic program guide, display a second GUI representing the update of the VOD content associated with another one of the at least two program information.

2. The display device of claim 1, wherein the processor is configured to receive, when receiving a user input selecting the GUI, the VOD content using the communication circuitry and display the received VOD content.

3. The display device of claim 1, wherein the processor is configured to:
while displaying the electronic program guide, display the GUI at a location corresponding to the identified program information.

4. The display device of claim 3, wherein the processor is configured to display the GUI at an area adjacent to a location corresponding to the identified program information.

5. The display device of claim 1, wherein the processor is configured to display the GUI through an indicator, when the identified program information associated with the VOD content is not currently displayed.

6. The display device of claim 5, wherein the indicator is an object to obtain an input to display the identified program information that is not currently displayed.

7. A method for displaying an electronic program guide, the method comprising:
receiving first information for a plurality of broadcast programs;
based on the first information, generating an electronic program guide including a plurality of channel information that is arranged in a column and a plurality of program information corresponding to each of the channel information, that is arranged in a row;
displaying the electronic program guide;
receiving second information regarding an update of video on demand (VOD) content associated with at least one program information included in the electronic program guide;
obtaining input for moving a cursor being displayed within the electronic program guide;
identifying, among the plurality of program information, program information that is located within a threshold distance from the cursor moved by the input;
determining, based on the second information, whether VOD content associated with the identified program information is updated,
when VOD content associated with the identified program information is updated, displaying a graphic user interface (GUI) representing the update of the VOD content associated with the identified program information with the electronic program guide; and
when receiving a user input for scrolling the electronic program guide, scrolling the plurality of channel information and the plurality of program information included in the electronic program guide,
wherein, while the plurality of channel information and the plurality of program information are scrolled, the displaying of the GUI is maintained and not scrolled, and
the method further comprises:
when at least two program information that are located within the threshold distance from the cursor and included in a same row of the electronic program guide are identified, determining whether each of VOD content associated with each of the identified at least two program information is updated based on the second information,
when the each of VOD content associated with each of the identified at least two program information is updated, displaying a first GUI representing the update of the VOD content associated with one of the at least two program information while the at least two program information are displayed, and
when the at least two program information are not displayed and then re-displayed by the user input for scrolling the electronic program guide, displaying a second GUI representing the update of the VOD content associated with another one of the at least two program information.

8. The method of claim 7, further comprising:
when receiving a user input selecting the GUI, receiving the VOD content using the communication circuitry and display the received VOD content.

9. The method of claim 7, further comprising:
while displaying the electronic program guide, displaying the GUI at a location corresponding to the identified program information.

10. The method of claim 9, further comprising:
displaying the GUI at an area adjacent to a location corresponding to the identified program information.

11. The method of claim 7, further comprising:
displaying the GUI through an indicator, when the identified program information associated with the VOD content is not currently displayed.

12. The method of claim 11, wherein the indicator is an object to obtain an input to display the identified program information that is not currently displayed.

* * * * *